United States Patent

[11] 3,602,812

| [72] | Inventor | Ronald Y. Paradise<br>Hillsdale, N.J. |
|---|---|---|
| [21] | Appl. No. | 789,201 |
| [22] | Filed | Jan. 6, 1969 |
| [45] | Patented | Aug. 31, 1971 |
| [73] | Assignee | Singer-General Precision, Inc.<br>Little Falls, N.J. |

[54] MEASURING THE RELATIVE PHASES OF SEQUENTIAL SIGNAL BURSTS
8 Claims, 3 Drawing Figs.

[52] U.S. Cl. ................................................ 324/85
[51] Int. Cl. ............................................... G01r 25/00
[50] Field of Search .................................. 324/85, 83
A; 343/105; 328/133

[56] References Cited
UNITED STATES PATENTS

| 3,249,868 | 5/1966 | Sheftelman | 328/133 X |
| 3,253,223 | 5/1966 | Kettel | 328/133 X |
| 3,345,572 | 10/1967 | Kaplan et al. | 324/83 A X |
| 3,471,856 | 10/1969 | Laughlin, Jr. et al. | 343/105 X |
| 3,473,113 | 10/1969 | Schluter | 324/83 A X |

FOREIGN PATENTS

| 548,066 | 10/1957 | Canada | 328/160 |

*Primary Examiner*—Alfred E. Smith
*Attorneys*—S. A. Giarratana, G. B. Oujevolk and S. M. Bender ABSTRACT: This specification discloses a phase measuring system, which measures the relative phases of received sequential RF signal bursts by multiplying them with waveforms at the same frequency as the RF signal bursts 90° displaced in phase from one another. The impulses resulting from the multiplication are integrated to provide analogue signals representing the sine and cosine of the relative phase angles of the received signal bursts. These analogue signals are converted to digital signals which are applied to a digital computer adapted to utilize the received phase information for navigational purposes.

INVENTOR
RONALD Y. PARADISE

BY S. A. Giarratana
ATTORNEY

MEASURING THE RELATIVE PHASES OF SEQUENTIAL SIGNAL BURSTS

BACKGROUND OF THE INVENTION

This invention relates to phase angle measurement and, more particularly, to a system for measuring the relative phase angle differences among a plurality of RF signal bursts received sequentially such as by an Omega receiver, Decca receiver, or other similar systems.

The invention is described for use in the Omega system as an example. An omega receiver is a receiver in the Omega navigational system, in which eight stations situated at different locations, transmit phase locked RF signals at the same three frequencies, 10.2 kilohertz, 13.6 kilohertz and 11.5 kilohertz. The relative phases of the signals received by a receiver from a plurality of stations at the same frequency can be used to compute the position of the receiver and, accordingly, the position of the vessel carrying the receiver. Each transmitter transmits each frequency in one second bursts every 10 seconds with each station transmitting its burst at a given frequency at a different time in the 10 second interval. The Omega system is disclosed in a publication entitled *Omega, A World Wide Navigational system*, Second Edition, prepared by the Omega Implementation committee, A. Pierce, W. Palmer, A. D. Watt and R. H. Woodward, published May 1, 1966 by Packard & Burns Electronics, 103 Fourth Avenue, Walham 54, Mass. and identified by Defense Documentation Center No. AD-630-900 and by Packard & Burns Publication No. 886B.

Prior to the present invention, Omega receivers employed a multitude of phase locked loops to track and measure the phases of the three different frequencies transmitted from each of a plurality of transmitting stations. Because the phases must be averaged over long periods of time, complex compensation signals had to be generated to compensate for doppler effect caused by the motion of the vessel carrying the receiver. The phase measuring function of the Omega receiver comprises a major part of the Omega receiver, and the phase measuring system of the present invention provides a substantial simplification of this portion of the Omega receiver. This is due to the inherent simplicity of the phase measuring method and the time sharing of the same hardware over a plurality of channels. The method of phase measurement employed will provide accuracy in the presence of noise equivalent to that of systems employing a multitude of phase locked loops.

SUMMARY OF THE INVENTION

As pointed out above, each of the transmitting stations transmits signals at the same three frequencies, 10.2 kilohertz, 13.6 kilohertz and 11.5 kilohertz. Each station transmits in its turn a 1 second burst at 10.2 megahertz every 10 seconds. The other two frequencies, likewise, are transmitted in 1 second bursts in turn from each of the stations.

When the phase detector system of the present invention is used in an Omega receiver, three phase detecting systems are provided, one for each of the three frequencies. Each of the phase detectors comprises a precision oscillator, which produces an output frequency at the frequency of the signals, the relative phases of which are to be measured. The oscillator produces two output waveforms, which are 90° apart in phase. The output signals of the oscillator are multiplied by each received signal burst to produce two output signals for each burst having DC components proportional to the sine and cosine of the relative phase of the received burst. The outputs of the multipliers are applied to filters to provide an analogue voltage for each burst representing the sine and cosine of the relative phase angle of each received RF signal burst. These analogue signals are then converted to digital signals and are fed to a computer, which will average the relative phase signals over several bursts from each station and compute the position from the relative phases. Because the phase determination is made independently for each short burst, rather than by relying on phase locking from previously received bursts, the doppler effect is insignificant and compensation for the vessel velocity is confined to the computer only.

Accordingly, one object of the present invention is to provide an improved phase measuring system.

Another object of the present invention is to provide an improved system for determining the relative phases of RF signal bursts received sequentially.

A still further object of the present invention is to simplify phase measuring systems of the type described.

Further objects and advantages of the present invention will become readily apparent as the following detailed description of the invention unfolds.

DETAILED DESCRIPTION OF THE INVENTION

Figure 1:
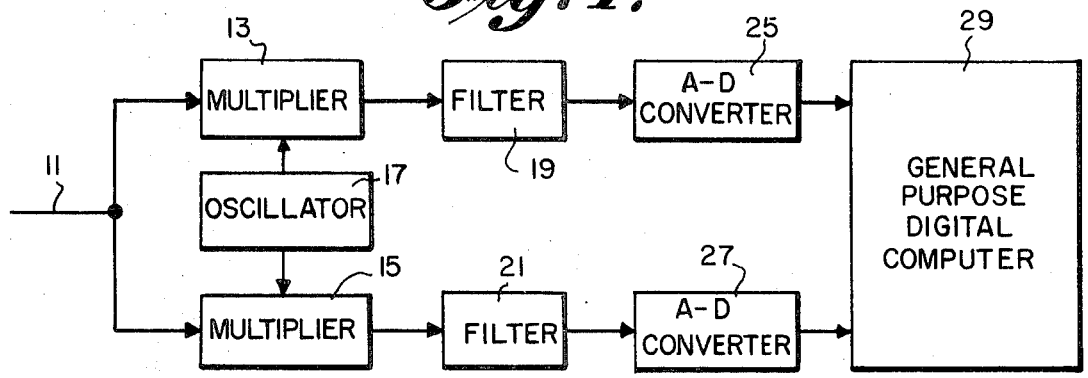
FIG. 1 is a block diagram of the phase detecting system of the present invention.

In the phase measuring system illustrated in FIG. 1, the RF 1-second signal bursts are received in sequence on an input channel designated by the reference number 11. These signal bursts, as pointed out above, will be received from a plurality of different stations, each of which will transmit a signal burst in turn every 10 seconds. As a result, a plurality of 1-second signal bursts will be received on channel 11 every 10 seconds. These signal bursts will be of the same frequency, but will vary in phase because of being received from stations situated at different locations. The signal bursts are applied to channel 11 by a radio receiver not shown in FIG. 1, which receiver also receives the other two frequencies transmitted by the transmitting stations and applies them to other phase measuring systems like the one shown in FIG. 1. The radio receiver, in addition to sorting out the signal bursts of a particular frequency from the transmitting stations and applying them to the appropriate phase measuring system, also acts on the received bursts to standardize their amplitudes so that all of the bursts applied to the phase measuring systems have the same predetermined amplitude. Accordingly, the sequential RF bursts received on channel 11 will have the same predetermined amplitude. The signal bursts received on channel 11 are applied to a multiplier 13 and to a multiplier 15, which are also connected to receive output signals from a precision oscillator 17. The oscillator 17 applies wave forms 90° displaced in phase from each other at the frequency of the signal bursts received on input channel 11 to the multipliers 13 and 15. The waveform applied to the multiplier 13 by the oscillator 17 is designated as representing $2 \cos \omega t$, in which $\omega$ is the frequency of the received signal bursts on channel 11. The waveform applied to the multiplier 15 is equal in amplitude to the waveform applied to multiplier 13 and leads this waveform by 90°. Accordingly, this waveform is designated as $-2 \sin \omega t$. A given signal burst, received on channel 11, may be represented by $A\cos(\omega t + \Phi)$, in which $\Phi$ is the phase of the given signal burst relative to the phase of the oscillator waveform applied to the multiplier 13 and A is the predetermined amplitude of the burst. The multipliers 13 and 15 multiply the oscillator waveforms applied thereto times the received signal bursts. If $2 \cos \omega t$ is multiplied times $A\cos(\omega t + \Phi)$, the following expression results: $A\cos\Phi + A(\cos\Phi \cos 2\omega t - \sin\Phi \sin 2\omega t)$. Accordingly, the output of the multiplier 13, in response to a received signal burst, will be a signal impulse having a DC component proportional to the amplitude A of the signal burst and the cosine of the relative phase $\Phi$ of the signal burst. On top of this DC component, the impulse will have an AC component at twice the frequency of the received signal bursts and of the oscillator 17.

The multiplication of the expression $-2\sin\omega t$ and $A\cos(\omega t+\Phi)$ representing the waveforms applied to the multiplier 15 results in the following expression: $A\sin\Phi-A(\cos\Phi\sin2\omega t-\sin\Phi\cos2\omega t)$. Accordingly, the output of the multiplier 15, in response to an applied signal burst, will be an impulse having a DC component proportional to the amplitude of the applied signal burst, and proportional to the sine of the phase angle $\Phi$ of the received signal burst. On top of this DC component, the impulse will have an AC component at twice the frequency of the received signal burst and of the oscillator 17.

The output of the multiplier 13 is applied to an optimum filter 19 to filter out noise and the AC component produces an output signal proportional to $A\cos\Phi$. Similarly, the output of the multiplier 15 is applied to an optimum filter 21, which will produce an output signal proportional to the DC component of the impulse applied from the multiplier 15. Optimum filters, to perform the filtering function of the filters 19 and 21, happen to be so called matched filters. The matched filters preferably are implemented by integrators which are reset to zero at the beginning of each burst, as is described with reference to FIG. 2.

Since the amplitude A of the RF bursts is a predetermined known value, the outputs of the filters 19 and 21 may be considered to represent cosine $\Phi$ and sine $\Phi$. The outputs of the filters 19 and 21 are applied to analogue digital converters 25 and 27, which convert the received analogue signals to digital signals representing sine $\Phi$ and cosine $\Phi$, which digital signals are applied to a digital computer 29. In this manner, digital signals representing sine $\Phi$ and cosine $\Phi$ of the phase angle of each signal burst relative to the phase angle of the oscillator waveform applied to the multiplier 13 are applied to the digital computer 29. The digital computer 29 sorts out the phase angle signals according to the station from which they originated and averages these signals for each station over a sufficient number of periods to provide a more precise indication of the phase of the signal being transmitted by such station. The digital computer can then make a computation of a position from the phases thus determined. Since the position determining function from the detected phase information forms no part of this invention, this function will not be described in detail in this application. The above cited publication entitled *Omega, A World Wide Navigational System* discloses how a digital computer can be used to determine the receiver position from the detected phase information.

Figure 2:
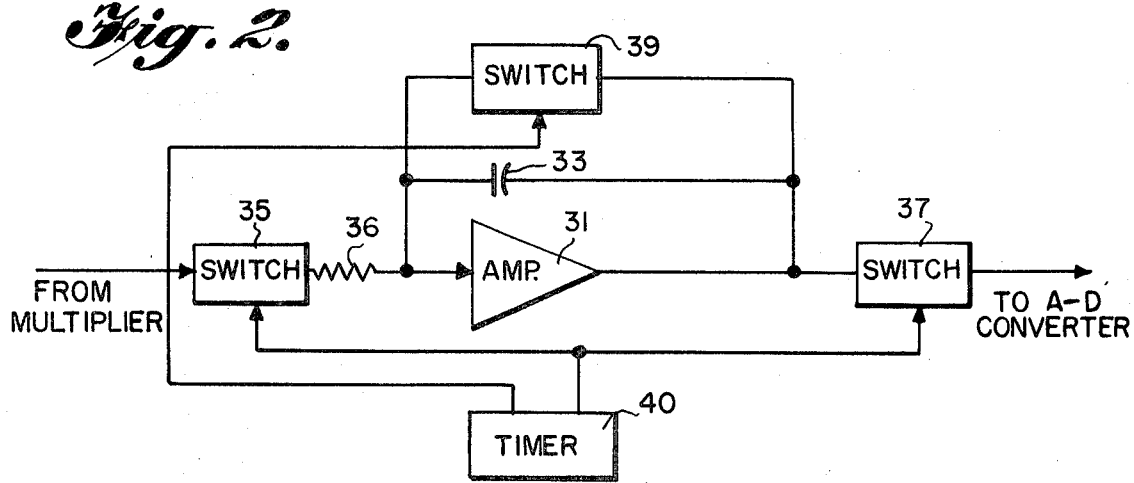
FIG. 2 is a circuit diagram illustrating a component of the system shown in FIG. 1; and, FIG. 3 is a block diagram of an Omega receiver incorporating the phase detector of the present invention.

As pointed out above, the optimum filters 19 and 21 preferably are integrators and each has a circuit such as that illustrated in FIG. 2. As shown in FIG. 2, the integrator comprises a DC amplifier 31 having typically a maximum offset of 10 millivolts and having a 1 microfarad capacitor 33 connected between the input and a resistor and output terminals thereof. An electronic switch 35 is connected to the input of the amplifier 31 through a resistor 36, which typically has a value of 1 megohm. An electronic switch 37 is connected to the output of the amplifier 31 and an electronic switch 39 is connected across the capacitor 33. A timer 40 controls the electronic switches 35, 37 and 39 in response to the signal bursts which are applied to channel 11. The timer 40 closes the switch 35 at the start of each radio frequency burst received to apply to the input of the amplifier 31 the resulting impulse produced by the multiplier connected to the input of the filter shown in FIG. 2. Simultaneously, the timer will open the switch 39 so that a signal voltage will be built up across the capacitor 33 and, at the output of the amplifier 31 proportional to the integral of the applied impulse. At the end of the impulse, the timer 40 will open the switch 35 and close the switch 37 to apply a signal voltage proportional to the integral of the impulse to the analogue digital converter connected to the output of the filter shown in FIG. 2. The analogue to digital converter thereupon will convert the applied analogue signal voltage to a digital signal representation, which is applied to the digital computer 29. After a time interval, sufficient for the analogue to digital converter to respond to the applied signal voltage, the timer 40 will open the switch 37 and will close the switch 39 to discharge the capacitor 33 and thus reset the integrator back to zero. The opening of the switch 37 and the closure of the switch 39 will take place prior to the next burst received on channel 11, whereupon the cycle of switch operation will be repeated. When integrators such as that shown in FIG. 2 are used for the filters 19 and 21, the output signal voltage of the integrators after integrating throughput the interval of an applied signal burst will be proportional to the sine and cosine of the best estimate for the phase angle $\Phi$ of the applied signal burst for any noise level.

Instead of using an analogue integrator for the optimum filter, a digital reset integrator could be used, which would eliminate the need for the analogue to digital converters. The digital integrators would produce a pulse output equal in number to the integral of the impulse output from the multiplier. This pulse output could be applied to a counter to provide a digital representation of the integral and thus provide a digital representation of the sine of the angle $\Phi$ and the cosine of the angle $\Phi$.

In the preferred embodiment, the multipliers 13 and 15 are actually switches which close during the positive cycles of the applied waveforms received from the oscillator 17 and open during the negative portions of these cycles. These switches, in effect, instead of multiplying the input waveforms times sine and cosine waveforms, multiplies the input waveforms by square waveforms, which are displaced from each other by 90°. The resulting output impulses from the multiplier will still have DC components proportional to the relative phase of the received signal bursts. However, the noise level relative to the signal voltage will be slightly increased. This disadvantage is more than offset by the great hardware simplification which the use of switches instead of ideal multipliers permits.

Figure 3:
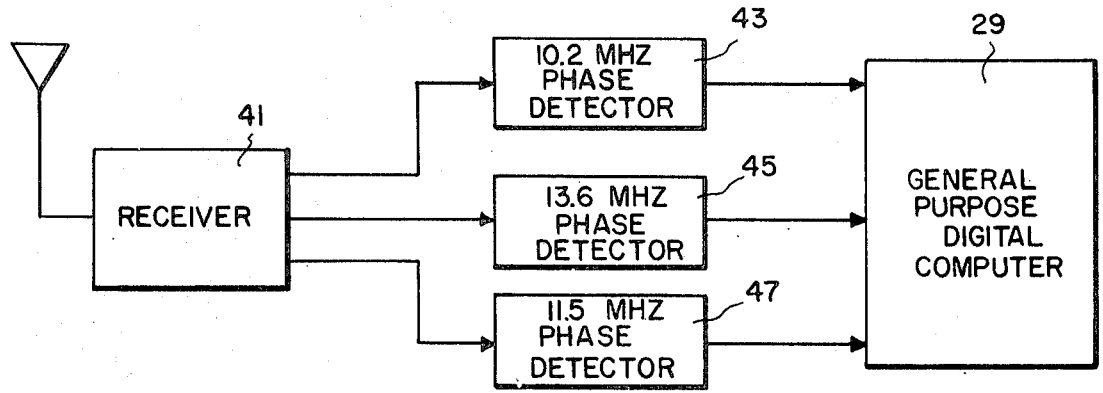

In the block diagram illustrated in FIG. 3 showing how the phase detector system of the present invention is incorporated in an Omega receiver, the reference number 41 designates a radio frequency receiver which sorts out the received frequency burst of 10.2, 13.6 and 11.5 kilohertz. The 10.2 kilohertz bursts are applied to a phase detector 43, the 13.6 kilohertz bursts are applied to a detector 45 and the 11.5 kilohertz are applied to a detector 47. The receiver 41 also sets the amplitudes of the signal bursts applied to each of the phase detectors 43, 45 and 47 to be at the constant predetermined amplitude A. Phase detectors 43, 45 and 47 each comprises a phase detector such as disclosed in FIG. 1 and, accordingly, each produces digital output signals representing the relative phase of the applied signal bursts. These digital output signals are applied to the general purpose digital computer 29, which averages the bursts from each station to get an average phase for the signal received from each station over several bursts and then utilizes this phase information to compute the position of the receiver.

The digital output signals from each of the phase detectors, as pointed out above, will represent the phase of the received signals relative to the phase of the signals produced by the oscillator of each phase detector. Since this oscillator frequency can drift, each digital signal by itself would not provide very accurate information. However, the information which the computer utilizes is the phase of each of the signals at a given frequency relative to the phase of the other signals. Since the oscillator drift between bursts will be negligible, this information will be very precise in spite of some oscillator drift. In particular, a constant drift rate of the oscillator can be completely compensated by subsequent computations of the computer.

The above description is of preferred embodiments of the present invention and many modifications may be made thereto without departing from the spirit and scope of the invention which is defined in the appended claims.

1. A phase detecting system for detecting the relative phases of received AC signal bursts comprising an input for receiving signal bursts, an oscillator producing an output signal at the frequency of said signal bursts, multiplying means for multiplying the output signal of said oscillator times the signal bursts received on said input to produce an impulse for each signal burst having a DC component proportional to the phase angle between such signal burst and said oscillator signal, integrating means for integrating the output of said multiplying means for the interval of each of said signal bursts to produce a signal representing the integral of each impulse produced by said multiplying means, said integrating means commencing integration at the start of each of said signal bursts and ending at the end of each of said signal bursts, said integrating means including means to reset the output of said integrating means to zero between said signal bursts.

2. A phase measuring system as recited in claim 1 wherein said multiplying means comprises an electronic switch closing during one half of each cycle of said output signal of said oscillator and opening during the other half of each cycle of said output signal of said oscillator.

3. A phase measuring system comprising a source of sequential AC signal bursts of varying phases, an oscillator producing an output signal at the frequency of said signal bursts, and phase detecting means connected to receive said output signal from said oscillator and to receive said signal bursts to produce an output signal representation for each signal burst representing the phase of such burst relative to the phase of said oscillator signal, said phase detecting means comprising multiplying means multiplying said oscillator signal times each of said signal bursts to produce an output impulse for each burst having a DC component proportional to the cosine of the phase difference between said oscillator signal and such burst and integrating means for integrating the output of said multiplying means for the interval of each of said AC signal bursts to provide a signal representing the integral of each impulse produced by said multiplying means, said integrating means commencing integration at the start of each of said signal bursts and ending at the end of each of said signal bursts, said integrating means including means to reset the output of said integrating means to zero between said signal bursts.

4. A phase measuring system as recited in claim 3 wherein said signal representation produced by said phase detecting means comprises a digital representation of the phase of each burst relative to said oscillator signal.

5. A phase measuring system comprising a source of sequential AC signal bursts of varying phases, an oscillator producing a first output signal at the frequency of said signal bursts and a second output signal at the frequency of said signal burst displaced from said first oscillator signal by 90°, phase detecting means connected to receive said signal bursts to produce output signal representations for each signal burst representing the phase of such burst relative to the phase of said oscillator signal, said phase detecting means comprising first multiplying means connected to multiply said first oscillator signal times each of said signal bursts to produce an impulse for each burst having a DC component proportional to the cosine of the phase angle between such signal burst and said oscillator signal, second multiplying means connected to multiply said second oscillator signal times each signal burst to produce an impulse for each signal burst having a DC component proportional to the sine of the phase angle between such signal burst and said first oscillator signal, first integrating means for integrating the output of said first multiplying means for the interval of each of said signal bursts to produce an output signal representing the integral of each impulse produced by said first multiplying means, and second integrating means for integrating the output of said second multiplying means for the interval of each of said signal bursts to produce an output signal proportional to the integral of each impulse produced by said second multiplying means, said first and second integrating means commencing integration at the start of each of said signal bursts and ending integration at the end of each of said signal bursts, said integrating means including means to reset the output of said integrating means to zero between said signal bursts.

6. A phase measuring system as recited in claim 5 wherein said signal representations representing said sine and cosine each comprises digital signals.

7. A phase measuring system for measuring the relative phase of received AC signal bursts comprising an output for receiving said signal bursts, an oscillator producing first and second waveforms at the frequency of said signal bursts and displaced from one another by 90°, first multiplying means connected to multiply said first output waveform of said oscillator times the signal burst received on said input and to produce an impulse for each signal burst having a DC component proportional to the cosine of the phase angle between such signal burst and said first waveform, second multiplying means connected to multiply said second waveform times each signal burst received on said input to produce an output impulse for each signal burst having a DC component proportional to the sine of the phase angle between such signal burst and said first oscillator waveform, first integrating means for integrating the output of said first multiplying means for the interval of each of said signal bursts to produce an output signal representing the integral of each impulse produced by said first multiplying means, and a second integrating means for integrating the output of said second multiplying means for the interval of each of said signal bursts to produce an output signal representing the integral of each impulse produced by said second integrating means, said first and second integrating means commencing integration at the start of each of said signal bursts, said integrating means including means to reset the output of said integrating means to zero between said signal bursts.

8. A phase measuring system comprising a source of sequential AC signal bursts of varying phases, an oscillator producing first and second waveforms at the frequency of said signal bursts displaced from one another by 90°, first multiplying means connected to multiply said first output waveform of said oscillator times said signal bursts and produce an impulse for each signal burst having a DC component proportional to the cosine of the phase angle between such signal burst and said first waveform, and second multiplying means connected to multiply said second waveform times each of said signal bursts to produce an output impulse for each signal burst having a DC component proportional to the sine of the phase angle between such signal burst and said first oscillator waveform, said first multiplying means comprising a first electronic switch closing during one half of each cycle of said first oscillator waveform and opening during the other half of each cycle said SAID first oscillator waveform, said second multiplying means comprising an electronic switch closing during one half of each cycle of said second oscillator waveform and opening during the other half of each cycle of said second oscillator waveform, first integrating means for integrating the output of said first multiplying means for the interval of each of said signal bursts to produce an output signal representing the integral of each impulse produced by said first multiplying means, and second integrating means for integrating the output of said second multiplying means for the integral of each of said signal bursts to produce an impulse proportional to the integral of each impulse produced by said second multiplying means, said first and second integrating means commencing integration at the start of each of said signal bursts, said first and second integrating means including means to reset the outputs of said first and second integrating means to zero between signal bursts and means to convert the output signals of said first and second integrating means at the end of each of said signal bursts to digital signals.

UNITED STATES PATENT OFFICE
CERTIFICATE OF CORRECTION

Patent No. 3,602,812          Dated August 31, 1971

Inventor(s) Ronald Y. Paradise

It is certified that error appears in the above-identified patent and that said Letters Patent are hereby corrected as shown below:

Col. 6, line 63, after "bursts", insert --and ending integration at the end of each of said signal bursts,--.

Signed and sealed this 8th day of February 1972.

(SEAL)
Attest:

EDWARD M. FLETCHER, JR.
Attesting Officer

ROBERT GOTTSCHALK
Commissioner of Patents